(12) United States Patent
Che et al.

(10) Patent No.: US 11,233,732 B2
(45) Date of Patent: Jan. 25, 2022

(54) LABEL MANAGEMENT METHOD, DATA STREAM PROCESSING METHOD, AND DEVICE

(71) Applicant: Huawei Technologies Co., Ltd., Shenzhen (CN)

(72) Inventors: Jia Che, Beijing (CN); Shunwan Zhuang, Beijing (CN); Zhenbin Li, Beijing (CN); Shuanglong Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 16/025,258

(22) Filed: Jul. 2, 2018

(65) Prior Publication Data
US 2018/0309667 A1 Oct. 25, 2018

Related U.S. Application Data

(63) Continuation of application No. PCT/CN2016/091578, filed on Jul. 25, 2016.

(30) Foreign Application Priority Data

Dec. 30, 2015 (CN) .......................... 201511025680.3

(51) Int. Cl.
*G06F 15/16* (2006.01)
*H04L 12/723* (2013.01)
(Continued)

(52) U.S. Cl.
CPC ........ *H04L 45/507* (2013.01); *H04L 12/4633* (2013.01); *H04L 12/4641* (2013.01); *H04L 45/42* (2013.01); *H04L 45/50* (2013.01)

(58) Field of Classification Search
CPC . H04L 29/08072; H04L 29/06; H04L 45/507; H04L 12/4633; H04L 12/4641; H04L 45/42; H04L 45/45
(Continued)

(56) References Cited

U.S. PATENT DOCUMENTS 8,665,887 B2 * 3/2014 Ge .......................... H04L 45/04
370/401
9,225,649 B2 * 12/2015 Dutta ...................... H04L 45/28
(Continued)

FOREIGN PATENT DOCUMENTS

CN 101771561 A 7/2010
CN 101977138 A 2/2011
(Continued)

OTHER PUBLICATIONS

Machine Translation and Abstract of Chinese Publication No. CN101771561, Jul. 7, 2010, 15 pages.
(Continued)

*Primary Examiner* — Khanh Q Dinh
(74) *Attorney, Agent, or Firm* — Conley Rose, P.C.

(57) ABSTRACT

A label management method, a data stream processing method, and a device, where the label management method includes allocating, by a controller, a source label to a data stream, sending, by the controller, a first Border Gateway Protocol (BGP) update packet to an ingress network device on a label switching path (LSP) of the data stream, and sending a second BGP update packet to an egress network device on the LSP of the data stream, where the first BGP update packet includes a stream identifier of the data stream and the source label, and the second BGP update packet includes a mapping relationship between the source label and a source object of the data stream. Hence, configuration, management, and maintenance can be simplified.

18 Claims, 5 Drawing Sheets

---

An ingress network device receives a first BGP update packet sent by a controller, and receives a data stream sent by a CE, where the first BGP update packet includes a stream identifier of the data stream and a source label allocated by the controller to the data stream — 301

The ingress network device encapsulates the source label and a forwarding label in the data stream identified by the stream identifier — 302

The ingress network device sends the data stream to an egress network device on an LSP of the data stream according to the forwarding label such that the egress network device identifies, according to the source label, a source object from which the data stream originates — 303

(51) Int. Cl.
*H04L 12/717* (2013.01)
*H04L 12/46* (2006.01)

(58) Field of Classification Search
USPC .................. 709/224, 226, 228, 220, 232
See application file for complete search history.

(56) References Cited

U.S. PATENT DOCUMENTS

| | | | | |
|---|---|---|---|---|
| 9,264,361 | B2* | 2/2016 | Dutta | H04L 45/28 |
| 9,503,364 | B2* | 11/2016 | Zhang | H04L 45/32 |
| 9,559,941 | B2* | 1/2017 | Chen | H04L 45/22 |
| 10,581,733 | B2* | 3/2020 | Peng | H04L 45/54 |
| 2010/0265948 | A1 | 10/2010 | Patel et al. | |
| 2011/0286466 | A1* | 11/2011 | Ge | H04L 45/52 |
| | | | | 370/401 |
| 2013/0266012 | A1* | 10/2013 | Dutta | H04L 45/507 |
| | | | | 370/392 |
| 2014/0195675 | A1* | 7/2014 | Silver | H04H 20/18 |
| | | | | 709/224 |
| 2014/0237393 | A1* | 8/2014 | Van Wie | H04L 65/403 |
| | | | | 715/757 |
| 2014/0355419 | A1 | 12/2014 | Pillai | |
| 2015/0003231 | A1* | 1/2015 | Chen | H04L 45/22 |
| | | | | 370/221 |
| 2015/0085639 | A1* | 3/2015 | Chen | H04L 45/50 |
| | | | | 370/218 |
| 2015/0089629 | A1* | 3/2015 | Gu | H04L 45/507 |
| | | | | 726/15 |
| 2015/0109902 | A1 | 4/2015 | Kumar et al. | |
| 2015/0195195 | A1* | 7/2015 | Zhang | H04L 45/507 |
| | | | | 370/400 |
| 2015/0207675 | A1* | 7/2015 | Hayashi | H04L 45/50 |
| | | | | 370/225 |
| 2016/0014014 | A1* | 1/2016 | Bruno | H04L 45/507 |
| | | | | 370/254 |
| 2017/0034061 | A1* | 2/2017 | Zhang | H04L 45/507 |
| 2017/0187617 | A1* | 6/2017 | Caputo, II | H04L 43/16 |
| 2017/0279717 | A1* | 9/2017 | Bethers | H04L 45/748 |

FOREIGN PATENT DOCUMENTS

| | | | |
|---|---|---|---|
| CN | 102143080 A | 8/2011 | |
| CN | 102647328 A | 8/2012 | |
| CN | 103209125 A | 7/2013 | |
| CN | 103312611 A | 9/2013 | |
| CN | 106549871 A | 3/2017 | |
| EP | 2846498 A1 | 3/2015 | |
| WO | 2014194711 A1 | 12/2014 | |

OTHER PUBLICATIONS

Machine Translation and Abstract of Chinese Publication No. CN101977138, Feb. 16, 2011, 14 pages.
Machine Translation and Abstract of Chinese Publication No. CN102143080, Aug. 3, 2011, 13 pages.
Machine Translation and Abstract of Chinese Publication No. CN102647328, Aug. 22, 2012, 14 pages.
Foreign Communication From A Counterpart Application, Chinese Application No. 201511025680.3, Chinese Office Action dated Apr. 29, 2019, 9 pages.
Machine Translation and Abstract of International Publication No. WO2014194711, Dec. 11, 2014, 37 pages.
Li, Z., et al., "Use Cases and Framework of Service-Oriented MPLS Path Programming (MPP)," XP15099947, draft-li-spring-mpls-path-programming-00, Jul. 1, 2014, 15 pages.
Foreign Communication From A Counterpart Application, European Application No. 16880567.9, Extended European Search Report dated Nov. 7, 2018, 8 pages.
Chen, M., et al, "Multiprotocol Label Switching (MPLS) Source Label," draft-chen-mpls-source-label-06, Oct. 13, 2014, 13 pages.
Machine Translation and Abstract of Chinese Publication No. CN103549871, Mar. 29, 2017, 45 pages.
Machine Translation and Abstract of Chinese Publication No. CN103312611, Sep. 18, 2013, 38 pages.
Machine Translation and Abstract of Chinese Publication No. CN103209125, Jul. 17, 2013, 16 pages.
Foreign Communication From A Counterpart Application, PCT Application No. PCT/CN2016/091578, English Translation of International Search Report dated Oct. 28, 2016, 2 pages.
Foreign Communication From A Counterpart Application, PCT Application No. PCT/CN2016/091578, English Translation of Written Opinion dated Oct. 28, 2016, 4 pages.
Foreign Communication From A Counterpart Application, Chinese Application No. 201511025680.3, Chinese of Notice of Allowance dated Dec. 6, 2019, 4 pages.

* cited by examiner

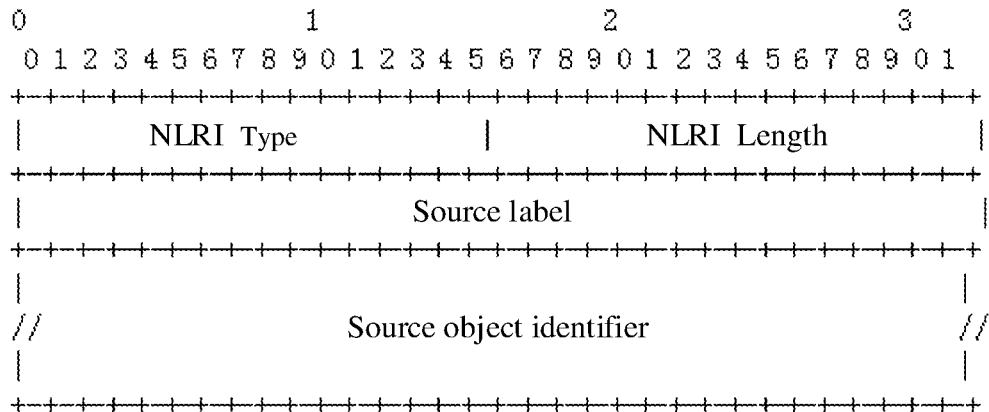

FIG. 2B

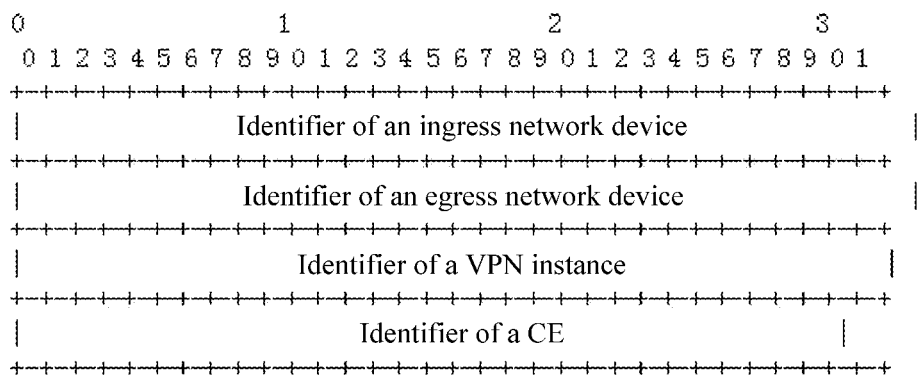

FIG. 2C

| An ingress network device receives a first BGP update packet sent by a controller, and receives a data stream sent by a CE, where the first BGP update packet includes a stream identifier of the data stream and a source label allocated by the controller to the data stream | ← 301 |

↓

| The ingress network device encapsulates the source label and a forwarding label in the data stream identified by the stream identifier | ← 302 |

↓

| The ingress network device sends the data stream to an egress network device on an LSP of the data stream according to the forwarding label such that the egress network device identifies, according to the source label, a source object from which the data stream originates | ← 303 |

FIG. 3

LABEL MANAGEMENT METHOD, DATA STREAM PROCESSING METHOD, AND DEVICE

CROSS-REFERENCE TO RELATED APPLICATIONS

This application is a continuation of International Patent Application No. PCT/CN2016/091578 filed on Jul. 25, 2016, which claims priority to Chinese Patent Application No. 201511025680.3 filed on Dec. 30, 2015. The disclosures of the aforementioned applications are hereby incorporated by reference in their entireties.

TECHNICAL FIELD

Embodiments of the present disclosure relate to the field of communications technologies, and in particular, to a label management method, a data stream processing method, and a device.

BACKGROUND

A multiprotocol label switching (MPLS) technology has been widely deployed in various networks of operators. MPLS may be applied at a service layer and used as a basis for creating various virtual private network (VPN) services, or may be applied at a transport layer and used for creating a label switching path (LSP). In the MPLS technology, a forwarding label is used to instruct forwarding of a traffic packet. If traffic needs to pass through multiple layers of LSPs, multiple layers of labels exist to form a label stack. At an ingress and an egress of each tunnel, a push operation and a pop operation are performed.

An operation, administration and maintenance (OAM) function is very important for a network that needs to provide a quality-of-service guarantee. OAM can simplify a network operation, verify network performance, and reduce network operation costs. Processing such as performance detection and fault alarm may be performed on an LSP in an MPLS network by applying the OAM function to the MPLS technology.

An OAM technology requires that a traffic source can be identified according to a traffic data packet. In a pure Internet Protocol (IP) network, an IP packet header carries source and destination IP addresses such that a traffic source can be easily identified. In an MPLS network, an MPLS forwarding label is only used to indicate a forwarding destination address, and does not indicate a source address of a traffic packet. Therefore, the OAM function in the MPLS network can be only applied to a particular scenario, for example, applied to a point-to-point (P2P) or point-to-multipoint (P2MP) scenario. In these scenarios, there is a unique ingress network device for traffic. Therefore, OAM can be used to identify an LSP passed by the traffic and learn the unique ingress network device of the traffic using an MPLS forwarding label. However, in a multipoint-to-point (MP2P) or multipoint-to-multipoint (MP2MP) scenario, traffic corresponds to multiple ingress network devices, and a traffic source cannot be identified according to an MPLS forwarding label.

To implement OAM in the MP2P or MP2MP scenario in the MPLS network, a source label solution is provided in other approaches. In the solution, a source label is used to identify an ingress network device of traffic. The ingress network device applies for a source label, and the ingress network device diffuses a mapping relationship between a source label and an ingress network device to another network device in a domain using the Interior Gateway Protocol (IGP). When traffic carrying a source label is forwarded to an egress network device, the egress network device identifies an ingress network device of the traffic according to the source label. This solution requires that a source label applied for by each ingress network device be unique in a source identifier administrative domain (SIAD), causing occupation of a global label space. Moreover, the mapping relationship between a source label and an ingress network device is diffused using the IGP and is published to all network devices that support a source label. As a result, each network device needs to maintain a large amount of information. In addition, to ensure that the mapping relationship is not diffused out of the SIAD, when the mapping relationship between a source label and an ingress network device is published using the Border Gateway Protocol (BGP) in a cross-autonomous system scenario, a complex filtering policy needs to be configured. That is, there are complex configuration, management, and maintenance problems in the existing source label solution.

SUMMARY

In view of this, embodiments of the present disclosure provide a label management method, a data stream processing method, and a device in order to simplify configuration, management, and maintenance.

According to a first aspect, an embodiment of the present disclosure provides a label management method, including allocating, by a controller, a source label to a data stream, sending, by the controller, a first BGP update packet to an ingress network device on an LSP of the data stream, and sending a second BGP update packet to an egress network device on the LSP of the data stream, where the first BGP update packet includes a stream identifier of the data stream and the source label, and the second BGP update packet includes a mapping relationship between the source label and a source object of the data stream.

With reference to the first aspect, in a first implementation of the first aspect, the source object of the data stream includes the ingress network device from which the data stream originates, a VPN instance on the ingress network device from which the data stream originates, or a customer edge (CE) of the VPN instance on the ingress network device from which the data stream originates.

With reference to the first aspect or the first implementation of the first aspect, in a second implementation of the first aspect, the source label is unique in the egress network device.

With reference to the first aspect or the first implementation of the first aspect, in a third implementation of the first aspect, the first BGP update packet further includes a source label identifier used to indicate that a label type is a source label.

With reference to the third implementation of the first aspect, in a fourth implementation of the first aspect, the second BGP update packet carries a source identifier attribute, and the source identifier attribute includes a type field used to indicate that a label type is a source label, and a source label field and a source object identifier field that are used to determine the mapping relationship between the source label and the source object of the data stream.

According to a second aspect, an embodiment of the present disclosure provides a data stream processing method, applied to an ingress network device on an LSP of a data stream, including receiving, by the ingress network device, a first BGP update packet sent by a controller, and receiving the data stream sent by a CE, where the first BGP update packet includes a stream identifier of the data stream and a source label allocated by the controller to the data stream, encapsulating, by the ingress network device, the source label and a forwarding label in the data stream identified by the stream identifier, and sending, by the ingress network device, the encapsulated data stream to an egress network device on the LSP of the data stream according to the forwarding label such that the egress network device identifies, according to the source label, a source object from which the data stream originates.

With reference to the second aspect, in a first implementation of the second aspect, the source object of the data stream includes the ingress network device from which the data stream originates, a VPN instance on the ingress network device from which the data stream originates, or a CE of the VPN instance on the ingress network device from which the data stream originates.

With reference to the second aspect or the first implementation of the second aspect, in a second implementation of the second aspect, the source label is unique in the egress network device.

With reference to the second aspect or the first implementation of the second aspect, in a third implementation of the second aspect, the first BGP update packet further includes a source label identifier used to indicate that a label type is a source label, and the source label identifier is further encapsulated in the data stream.

According to a third aspect, an embodiment of the present disclosure provides a data stream processing method, applied to an egress network device on an LSP of a data stream, including receiving, by the egress network device, a second BGP update packet sent by a controller, and receiving the data stream sent by an ingress network device, where a source label allocated by the controller to the data stream is encapsulated in the data stream, and the second BGP update packet includes a mapping relationship between the source label and a source object of the data stream, and determining, by the egress network device according to the source label and the mapping relationship between the source label and the source object of the data stream, that the data stream originates from the source object.

With reference to the third aspect, in a first implementation of the third aspect, the source object of the data stream includes the ingress network device from which the data stream originates, a VPN instance on the ingress network device from which the data stream originates, or a CE of the VPN instance on the ingress network device from which the data stream originates.

With reference to the third aspect or the first implementation of the third aspect, in a second implementation of the third aspect, the source label is unique in the egress network device.

With reference to the third aspect or the first implementation of the third aspect, in a third implementation of the third aspect, a source label identifier used to indicate that a label type is a source label is further encapsulated in the data stream.

With reference to the third implementation of the third aspect, in a fourth implementation of the third aspect, the second BGP update packet carries a source identifier attribute, and the source identifier attribute includes a type field used to indicate that a label type is a source label, and a source label field and a source object identifier field that are used to determine the mapping relationship between the source label and the source object of the data stream.

According to a fourth aspect, an embodiment of the present disclosure provides a controller, including a label allocation unit configured to allocate a source label to a data stream, and a sending unit configured to send a first BGP update packet to an ingress network device on an LSP of the data stream, and send a second BGP update packet to an egress network device on the LSP of the data stream, where the first BGP update packet includes a stream identifier of the data stream and the source label, and the second BGP update packet includes a mapping relationship between the source label and a source object of the data stream.

With reference to the fourth aspect, in a first implementation of the fourth aspect, the source object of the data stream includes the ingress network device from which the data stream originates, a VPN instance on the ingress network device from which the data stream originates, or a CE of the VPN instance on the ingress network device from which the data stream originates.

With reference to the fourth aspect or the first implementation of the fourth aspect, in a second implementation of the fourth aspect, the source label is unique in the egress network device.

With reference to the fourth aspect or the first implementation of the fourth aspect, in a third implementation of the fourth aspect, the first BGP update packet further includes a source label identifier used to indicate that a label type is a source label.

With reference to the third implementation of the fourth aspect, in a fourth implementation of the fourth aspect, the second BGP update packet carries a source identifier attribute, and the source identifier attribute includes a type field used to indicate that a label type is a source label, and a source label field and a source object identifier field that are used to determine the mapping relationship between the source label and the source object of the data stream.

According to a fifth aspect, an embodiment of the present disclosure provides an ingress network device. The ingress network device is an ingress network device on an LSP of a data stream, and includes a receiving unit configured to receive a first BGP update packet sent by a controller, and receive the data stream sent by a CE, where the first BGP update packet includes a stream identifier of the data stream and a source label allocated by the controller to the data stream, an encapsulation unit configured to encapsulate the source label and a forwarding label in the data stream identified by the stream identifier, and a sending unit configured to send the encapsulated data stream to an egress network device on the LSP of the data stream according to the forwarding label such that the egress network device identifies, according to the source label, a source object from which the data stream originates.

With reference to the fifth aspect, in a first implementation of the fifth aspect, the source object of the data stream includes the ingress network device from which the data stream originates, a VPN instance on the ingress network device from which the data stream originates, or a CE of the VPN instance on the ingress network device from which the data stream originates.

With reference to the fifth aspect or the first implementation of the fifth aspect, in a second implementation of the fifth aspect, the source label is unique in the egress network device.

With reference to the fifth aspect or the first implementation of the fifth aspect, in a third implementation of the fifth aspect, the first BGP update packet further includes a source label identifier used to indicate that a label type is a source label, and the source label identifier is further encapsulated in the data stream.

According to a sixth aspect, an embodiment of the present disclosure provides an egress network device. The egress network device is an egress network device on an LSP of a data stream, and includes a receiving unit configured to receive a second BGP update packet sent by a controller, and receive the data stream sent by an ingress network device on the LSP of the data stream, where a source label allocated by the controller to the data stream is encapsulated in the data stream, and the second BGP update packet includes a mapping relationship between the source label and a source object of the data stream, and a determining unit configured to determine, according to the source label and the mapping relationship between the source label and the source object of the data stream, that the data stream originates from the source object.

With reference to the sixth aspect, in a first implementation of the sixth aspect, the source object of the data stream includes the ingress network device from which the data stream originates, a VPN instance on the ingress network device from which the data stream originates, or a CE of the VPN instance on the ingress network device from which the data stream originates.

With reference to the sixth aspect or the first implementation of the sixth aspect, in a second implementation of the sixth aspect, the source label is unique in the egress network device.

With reference to the sixth aspect or the first implementation of the sixth aspect, in a third implementation of the sixth aspect, a source label identifier used to indicate that a label type is a source label is further encapsulated in the data stream.

With reference to the third implementation of the sixth aspect, in a fourth implementation of the sixth aspect, the second BGP update packet carries a source identifier attribute, and the source identifier attribute includes a type field used to indicate that a label type is a source label, and a source label field and a source object identifier field that are used to determine the mapping relationship between the source label and the source object of the data stream.

It can be learned from the foregoing technical solutions that the embodiments of the present disclosure have the following advantages.

In the embodiments of the present disclosure, the controller centrally allocates source labels to data streams, sends a source label to an ingress network device on an LSP of each data stream, and sends a meaning (that is, a mapping relationship between the source label and a source object of the data stream) of the source label only to an egress network device on the LSP of the data stream, that is, only to a specified egress network device. The meaning of the source label is not diffused to another irrelevant network device. Therefore, no BGP filtering policy needs to be configured, and each egress network device only needs to store and maintain information related to the egress network device, thereby simplifying information stored and maintained on each egress network device. The egress network device can identify a source of the data stream according to the source label carried in the data stream and the meaning of the source label sent by the controller, thereby simplifying configuration, management, and maintenance while implementing an OAM function in an MP2P or MP2MP scenario in an MPLS network.

Further, the source label allocated by the controller to the data stream is unique in the egress network device on the LSP of the data stream. Therefore, global uniqueness of the source label does not need to be considered, and no global label space is occupied.

In addition, source labels are used to indicate source objects of different granularities, and OAM applications of different granularities can be flexibly implemented on the egress network device according to a source label carried in a data stream and a mapping relationship between the source label and a source object. For example, statistics are collected about traffic from a particular ingress network device, statistics are collected about traffic that is from a particular ingress network device and that belongs to a particular VPN instance, or statistics are collected about traffic that is from a particular ingress network device, that belongs to a particular VPN instance, and that is sent by a particular private network.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 2B and FIG. 2C are schematic diagrams of a format of a source identifier attribute according to the present disclosure;

FIG. 3 is a schematic flowchart of a data stream processing method according to an embodiment of the present disclosure;

DESCRIPTION OF EMBODIMENTS

The following describes the technical solutions in the embodiments of the present disclosure with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
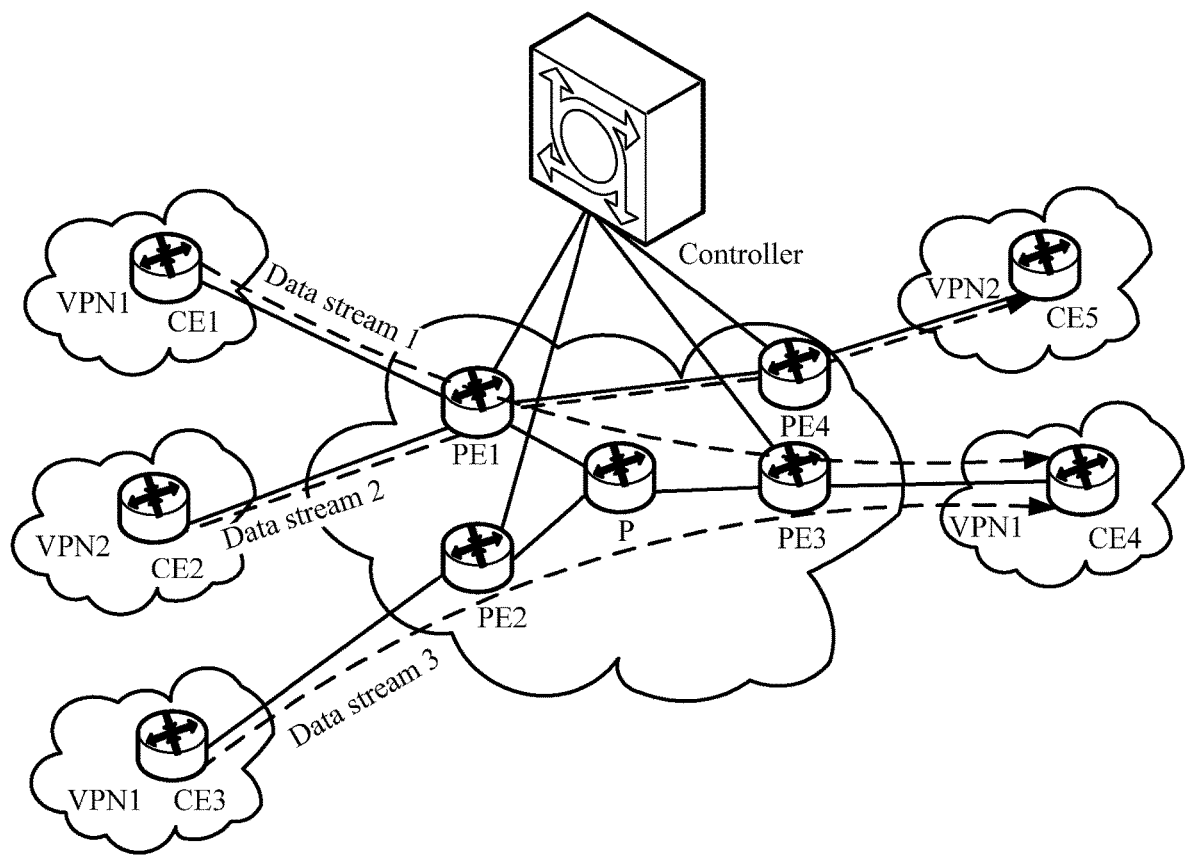
FIG. 1 is a schematic diagram of a network according to an embodiment of the present disclosure.

The embodiments of the present disclosure may be applied to an MPLS network, for example, applied to an MP2P scenario and an MP2MP scenario in the MPLS network. Certainly, the embodiments of the present disclosure may be further applied to a P2P scenario and a P2MP scenario in the MPLS network. This is not limited herein. A network in the embodiments of the present disclosure includes a controller and a network device. The network device may include an ingress network device such as an ingress provider edge (PE) device or an ingress label switching router (LSR), an intermediate network device such as an intermediate provider device or an intermediate LSR, and an egress network device such as an egress PE device or an egress LSR. The controller controls the network device to forward a data stream. The data stream is forwarded between the ingress network device and the egress network device using a forwarding label. As shown in FIG. 1, different data streams (a data stream 1 and a data stream 3) are finally sent to a same CE4 using different ingress network devices. To identify source objects from which the different data streams originate, the controller may allocate a source label to each data stream, send the source label allocated to each data stream to an ingress network device on an LSP of the corresponding data stream, and send a mapping relationship between the source label and a source object (where the mapping relationship is represented in a BGP update packet by a correspondence between a source label and a source object identifier) to an egress network device on the LSP of the corresponding data stream. The egress network device can identify, according to the source label and the mapping relationship between the source label and the source object, the source object from which the corresponding data stream originates.

Figure 2A:
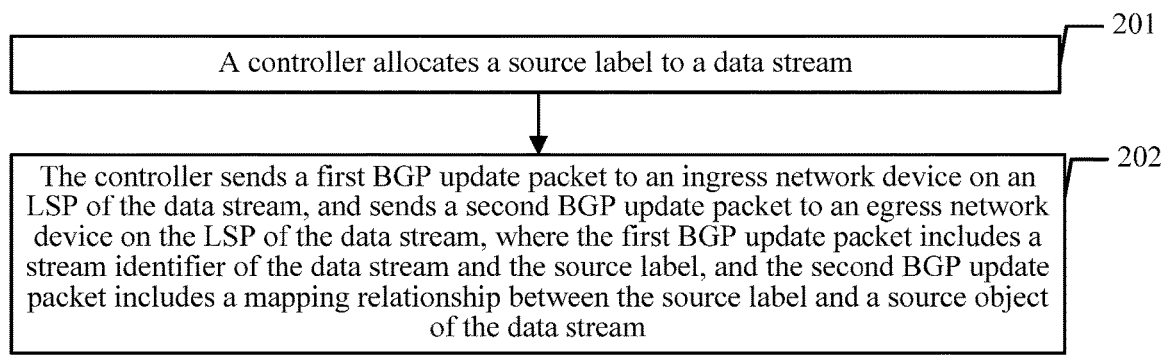
FIG. 2A is a schematic flowchart of a label management method according to an embodiment of the present disclosure.

FIG. 2A is a schematic flowchart of a label management method according to the present disclosure. The method in this embodiment includes the following steps.

Step 201: A controller allocates a source label to a data stream.

During specific implementation, related information of a data stream whose source object needs to be identified may be pre-configured in the controller. The related information may include, but is not limited to, information about a network device on an LSP of the data stream, such as an identifier of an ingress network device (for example, a name or an identifier of the device) on the LSP, an identifier of an intermediate network device, or an identifier of an egress network device. The related information may further include an identifier of a VPN instance (for example, a routing distinguish of the VPN instance) to which the data stream belongs, an identifier of a CE to which the data stream belongs (for example, a source IP address of the data stream), and the like.

The allocated source label may be a specific label value, and the allocated source label is used to identify a source object. In order of granularity from coarse to fine, the source object may be an ingress network device from which the data stream originates, a VPN instance on the ingress network device from which the data stream originates, or a CE of the VPN instance on the ingress network device from which the data stream originates.

Step 202: The controller sends a first BGP update packet to an ingress network device on an LSP of the data stream, and sends a second BGP update packet to an egress network device on the LSP of the data stream, where the first BGP update packet includes a stream identifier of the data stream and the source label, and the second BGP update packet includes a mapping relationship between the source label and a source object of the data stream.

Further, the first BGP update packet further includes a source label identifier used to indicate that a label type is a source label, and the source label and the source label identifier may be carried in a field in an existing attribute of the first BGP update packet. There are multiple label types, such as a QoS label, an entropy label, a colored label, and a source label. Further, in this embodiment of the present disclosure, if a source label allocated by the controller to a data stream 1 is 100, the source label identifier is used to indicate that 100 is a source label.

The stream identifier of the data stream is used to distinguish between different data streams. The stream identifier may be a name or routing information of the data stream. This is not limited herein.

The second BGP update packet carries a source identifier attribute, and the source identifier attribute includes a type field used to indicate that a label type is a source label, and a source label field and a source object identifier field that are used to determine the mapping relationship between the source label and the source object of the data stream.

Further, the source identifier attribute includes a network layer reachability information (NLRI) field. As shown in FIG. 2B, the NLRI field includes an NLRI type field, an NLRI length field, the source label field, and the source object identifier field (that is, a value field of the attribute). The NLRI type field is used to indicate that a label type is a source label. The NLRI length field is used to indicate an NLRI length. The source label field is used to carry the source label. The source object identifier field is shown in FIG. 2C, and the source object identifier field is used to carry an identifier of the source object and an identifier of the egress network device. The identifier that is of the source object and that is carried in the source object identifier field includes an identifier of the ingress network device of the data stream, includes an identifier of the ingress network device of the data stream and an identifier of the VPN instance, or includes an identifier of the ingress network device of the data stream, an identifier of the VPN instance, and an identifier of the CE. The identifier that is of the egress network device and that is carried in the source object identifier field is used to identify an egress network device that needs to identify the source object of the data stream according to the mapping relationship between the source label and the source object. The mapping relationship between the source label and the source object can be determined in combination with the content carried in the source label field and the source object identifier field.

Further, for example, if the source label indicates the ingress network device of the data stream, the egress network device can identify the ingress network device from which the data stream comes, if the source label indicates the VPN instance on the ingress network device of the data stream, the egress network device can identify the ingress network device that sends the data stream and the VPN instance to which the data stream belongs, if the source label indicates the CE of the VPN instance on the ingress network device of the data stream, the egress network device can identify the ingress network device from which the data stream comes, the VPN instance to which the data stream belongs, and the CE to which the data stream belongs.

In a specific example, as shown in FIG. 1, for the data stream 1, for example, the source label allocated by the controller to the data stream 1 is 101, and a source object indicated by 101 is a PE1. In this case, a BGP update packet sent to the PE1 carries a source label identifier and the source label (whose value is 101). In a BGP update packet sent to a PE3, a source label field carries the source label 101, and a source object identifier field carries an identifier of the PE1 and an identifier of the PE3. Therefore, after receiving the data stream 1 that carries the source label identifier and the source label 101, the PE3 may determine, in combination with 101 carried in the source label field and the identifier of the PE1 and the identifier of the PE3 carried in the source object identifier field in the received BGP update packet, that the data stream 1 comes from the PE1.

For example, the source label allocated by the controller to the data stream 1 is 102, and a source object indicated by 102 is a VPN1 on the PE1 (the PE1 further includes a VPN2). In this case, a BGP update packet sent to the PE1 carries a source label identifier and the source label 102. In a BGP update packet sent to the PE3, a source label field carries the source label 102, and a source object identifier field carries an identifier of the PE1, an identifier of the VPN1, and an identifier of the PE3. Therefore, after receiving the data stream 1 that carries the source label identifier and the source label 102, the PE3 may determine, in combination with the information carried in the source label field and the source object identifier field, that the data stream 1 comes from the VPN1 on the PE1.

For another example, the source label allocated by the controller to the data stream 1 is 103, and a source object indicated by 103 is a CE1 of the VPN1 on the PE1 (the data stream of the VPN1 on the PE1 may further come from another CE). In this case, a BGP update packet sent to the PE1 carries a source label identifier and the source label 103. In a BGP update packet sent to the PE3, a source label field carries the source label 103, and a source object identifier field carries an identifier of the PE1, an identifier of the VPN1, an identifier of the CE1, and an identifier of the PE3. Therefore, after receiving the data stream 1 that carries the source label identifier and the source label 103, the PE3 may determine, in combination with the information carried in the source label field and the source object identifier field, that the data stream 1 comes from the CE1 of the VPN1 on the PE1.

In this embodiment of the present disclosure, when the controller allocates the source label to the data stream, global uniqueness does not need to be considered, and only uniqueness of the allocated source label in the egress network device needs to be considered. For example, for the data stream 1 and a data stream 2, if the source label indicates the CE of the VPN on the ingress network device of the data stream, when the controller allocates the source label 103 to the data stream 1, the controller may also allocate the source label 103 (which may alternatively be another value) to the data stream 2. If the source labels allocated to the data stream 1 and the data stream 2 are all 103, in a BGP update packet sent to the PE3, a source label field carries the source label 103, and a source object identifier field carries an identifier of the PE1, an identifier of the VPN1, an identifier of the CE1, and an identifier of the PE3. In a BGP update packet sent to a PE4, a source label field carries the source label 103, and a source object identifier field carries the identifier of the PE1, an identifier of the VPN2, an identifier of a CE2, and an identifier of the PE4. Therefore, after receiving the data stream 1 that carries a source label identifier and the source label 103, the PE3 may determine, in combination with the information carried in the source object identifier field, that the data stream 1 comes from the CE1 of the VPN1 on the PE1. After receiving the data stream 2 that carries a source label identifier and the source label 103, the PE4 may determine, in combination with the information carried in the source object identifier field, that the data stream 2 comes from the CE2 of the VPN2 on the PE1.

It should be noted that both the controller and the ingress network device can identify different data streams according to stream identifiers of the data streams. The BGP update packet sent by the controller to the ingress network device carries a stream identifier of the data stream. After receiving a data stream, the ingress network device checks a stream identifier of the data stream. If the stream identifier of the data stream is consistent with a stream identifier of the data stream in a received BGP update packet, the ingress network device encapsulates, in the data stream, a source label identifier and a source label that are carried in the BGP update packet.

Referring to FIG. 3, FIG. 3 is a schematic flowchart of a data stream processing method according to an embodiment of the present disclosure. The method in this embodiment is applied to an ingress network device on an LSP of a data stream. The method in this embodiment includes the following steps.

Step 301: The ingress network device receives a first BGP update packet sent by a controller, and receives the data stream sent by a CE, where the first BGP update packet includes a stream identifier of the data stream and a source label allocated by the controller to the data stream.

Further, the first BGP update packet further includes a source label identifier used to indicate that a label type is a source label, and the source label and the source label identifier may be carried in a field in an existing attribute of the first BGP update packet. The first BGP update packet further includes the stream identifier of the data stream.

Step 302: The ingress network device encapsulates the source label and a forwarding label in the data stream.

The source label identifier is further encapsulated in the data stream. During specific implementation, when receiving a data stream, the ingress network device checks whether a first BGP update packet that includes a stream identifier of the data stream is received, and if the first BGP update packet that includes the stream identifier of the data stream is not received, encapsulates only a forwarding label in the data stream and forwards the data stream, or if the first BGP update packet that includes the stream identifier of the data stream is received, encapsulates a source label identifier, a source label, and a forwarding label that are carried in the first BGP update packet in the data stream and forwards the data stream.

The forwarding label refers to a short mark that has a fixed length and that is allocated to the data stream in an MPLS forwarding process. The mark and the data stream are encapsulated together. In the entire forwarding process, a network device of a switch node performs forwarding only according to the mark.

For example, as shown in FIG. 1, before the controller allocates a source label to a data stream 1, a PE1 encapsulates a forwarding label in the received data stream 1 sent by a CE1 and sends the data stream 1 to a device P. After the controller allocates a source label to the data stream 1, the PE1 encapsulates a source label identifier, a source label, and a forwarding label in the received data stream 1 sent by the CE1 and sends the data stream 1 to the device P.

Step 303: The ingress network device sends the data stream to an egress network device according to the forwarding label such that the egress network device identifies, according to the source label, a source object from which the data stream originates.

For a method for sending the encapsulated data stream to the egress network device by the ingress network device according to the forwarding label, refer to an existing MPLS label forwarding method. Details are not described herein. The source object of the data stream includes the ingress network device from which the data stream originates, a VPN instance on the ingress network device from which the data stream originates, or a CE of the VPN instance on the ingress network device from which the data stream originates.

Figure 4:
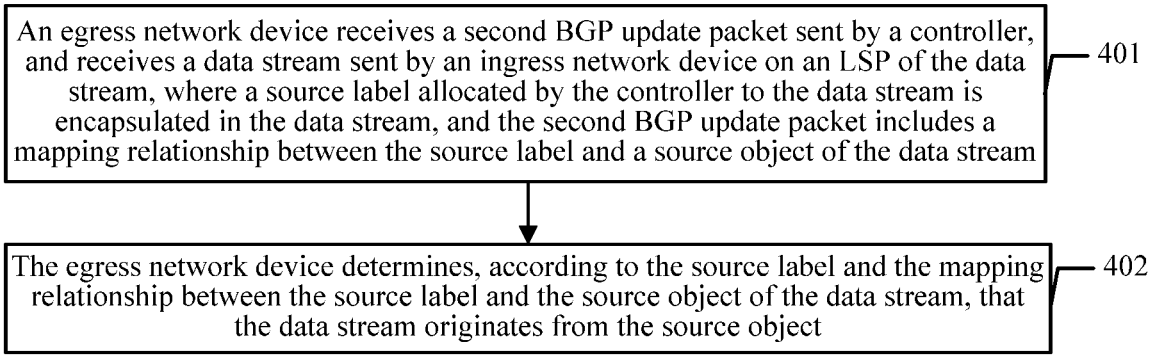
FIG. 4 is another schematic flowchart of a data stream processing method according to an embodiment of the present disclosure.

The foregoing embodiment describes the data stream processing method provided in the present disclosure from the perspective of an ingress network device side. The following describes a data stream processing method provided in the present disclosure from the perspective of an egress network device side. Referring to FIG. 4, the method in this embodiment is applied to an egress network device on an LSP of a data stream. The method in this embodiment includes the following steps.

Step 401: The egress network device receives a second BGP update packet sent by a controller, and receives the data stream sent by an ingress network device on the LSP of the data stream, where a source label allocated by the controller to the data stream is encapsulated in the data stream, and the second BGP update packet includes a mapping relationship between the source label and a source object of the data stream.

A source label identifier used to indicate that a label type is a source label is further encapsulated in the data stream. The second BGP update packet carries a source identifier attribute, and the source identifier attribute includes a type field used to indicate that a label type is a source label, and a source label field and a source object identifier field that are used to determine the mapping relationship between the source label and the source object of the data stream.

Further, the source identifier attribute includes an NLRI field. The NLRI field includes an NLRI type field, an NLRI length field, the source label field, and the source object identifier field (that is, a value field of the attribute). The NLRI type field is used to indicate that a label type is a source label. The NLRI length field is used to indicate an NLRI length. The source label field is used to carry the source label. The source object identifier field is used to carry an identifier of the source object and an identifier of the egress network device. The mapping relationship between the source label and the source object can be determined in combination with the content carried in the source label field and the source object identifier field.

Step 402: The egress network device determines, according to the source label and the mapping relationship between the source label and the source object of the data stream, that the data stream originates from the source object.

After receiving the data stream sent by the ingress network device, the egress network device pops the source label identifier, the source label, and a forwarding label that are carried in the data stream, and determines, according to the source label and the mapping relationship that is between the source label and the source object and that is sent by the controller, the source object from which the data stream originates.

In this embodiment of the present disclosure, the controller centrally allocates source labels to data streams, sends a source label to an ingress network device on an LSP of each data stream, and sends a meaning (that is, a mapping relationship between the source label and a source object of the data stream) of the source label only to an egress network device on the LSP of the data stream, that is, only to a specified egress network device. The meaning of the source label is not diffused to another irrelevant network device. Therefore, no BGP filtering policy needs to be configured, and each egress network device only needs to store and maintain information related to the egress network device, thereby simplifying information stored and maintained on each egress network device. The egress network device can identify a source of the data stream according to the source label carried in the data stream and the meaning of the source label sent by the controller, thereby simplifying configuration, management, and maintenance while implementing an OAM function in an MP2P or MP2MP scenario in an MPLS network.

Further, the source label allocated by the controller to the data stream is unique in the egress network device on the LSP of the data stream. Therefore, global uniqueness of the source label does not need to be considered, and no global label space is occupied.

In addition, source labels are used to indicate source objects of different granularities, and OAM applications of different granularities can be flexibly implemented on the egress network device according to a source label carried in a data stream and a mapping relationship between the source label and a source object. For example, statistics are collected about traffic from a particular ingress network device, statistics are collected about traffic that is from a particular ingress network device and that belongs to a particular VPN instance, or statistics are collected about traffic that is from a particular ingress network device, that belongs to a particular VPN instance, and that is sent by a particular private network.

Figure 5:
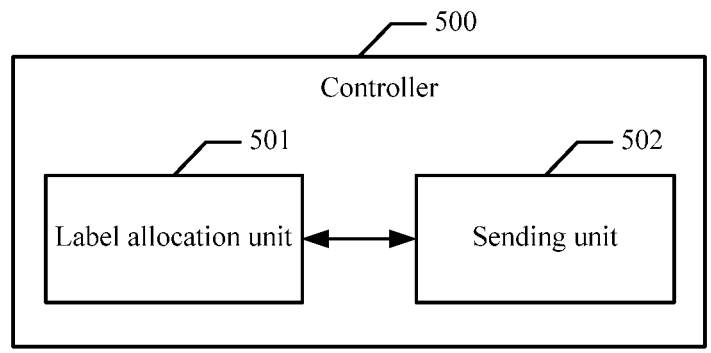
FIG. 5 is a schematic structural diagram of a controller according to an embodiment of the present disclosure.

The following describes a controller configured to implement the label management method shown in FIG. 2A. Referring to FIG. 5, the controller 500 in this embodiment includes a label allocation unit 501 configured to allocate a source label to a data stream, and a sending unit 502 configured to send a first BGP update packet to an ingress network device on an LSP of the data stream, and send a second BGP update packet to an egress network device on the LSP of the data stream, where the first BGP update packet includes a stream identifier of the data stream and the source label, and the second BGP update packet includes a mapping relationship between the source label and a source object of the data stream.

Further, the source object of the data stream includes the ingress network device from which the data stream originates, a VPN instance on the ingress network device from which the data stream originates, or a CE of the VPN instance on the ingress network device from which the data stream originates.

Further, the first BGP update packet further includes a source label identifier used to indicate that a label type is a source label.

Further, the source label is unique in the egress network device.

Further, the second BGP update packet carries a source identifier attribute, and the source identifier attribute includes a type field used to indicate that a label type is a source label, and a source label field and a source object identifier field that are used to determine the mapping relationship between the source label and the source object of the data stream.

Further, the second BGP update packet carries the source identifier attribute, and the source identifier attribute includes an NLRI field. The NLRI field includes an NLRI type field, an NLRI length field, the source label field, and the source object identifier field. The NLRI type field is used to indicate that a label type is a source label. The NLRI length field is used to indicate an NLRI length. The source label field is used to carry the source label. The source object identifier field is used to carry an identifier of the source object and an identifier of the egress network device.

It should be noted that for steps not detailed in this embodiment, refer to the descriptions of the method embodiment shown in FIG. 2A. Details are not described herein again.

Figure 6:
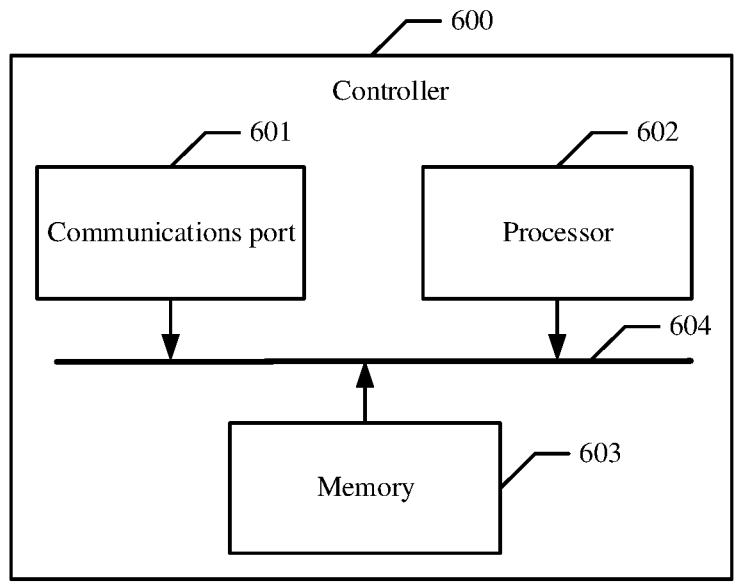
FIG. 6 is another schematic structural diagram of a controller according to an embodiment of the present disclosure.

Corresponding to the method shown in FIG. 2A, FIG. 6 is a schematic diagram of another embodiment of a controller 600 according to the present disclosure. The controller 600 in this embodiment includes a communications port 601, a processor 602, a memory 603, and a bus 604. The processor 602, the memory 603, and the communications port 601 are connected and complete communication with each other using the bus 604.

The bus 604 may be an industry standard architecture (ISA) bus, a peripheral component interconnect (PCI) bus, an extended ISA (EISA) bus, or the like. The bus 604 may be classified into one or more of an address bus, a data bus, or a control bus. For convenience of representation, only one bold line is used for representation in FIG. 6, but it does not represent that there is only one bus or one type of bus.

The memory 603 is configured to store executable program code. The program code includes a computer operation instruction. When the controller 600 executes the program code, the controller 600 can complete step 201 and step 202 in the embodiment in FIG. 2A, and can implement all functions of the controller 500 in the embodiment in FIG. 5. The memory 603 may include a high-speed Random Access Memory (RAM). Optionally, the memory 603 may further include a non-volatile memory. For example, the memory 603 may include a magnetic disk memory.

The processor 602 may be a central processing unit (CPU) or an application-specific integrated circuit (ASIC), or may be configured into one or more integrated circuits for implementing this embodiment the present disclosure.

Further, in this embodiment, the processor 602 is configured to allocate a source label to a data stream, and send a first BGP update packet to an ingress network device on an LSP of the data stream using the communications port 601, and send a second BGP update packet to an egress network device on the LSP of the data stream using the communications port 601, where the first BGP update packet includes a stream identifier of the data stream and the source label, and the second BGP update packet includes a mapping relationship between the source label and a source object of the data stream.

In addition, the processor 602 is further configured to perform other actions in the method embodiment corresponding to FIG. 2A. Details are not described herein again.

Figure 7:
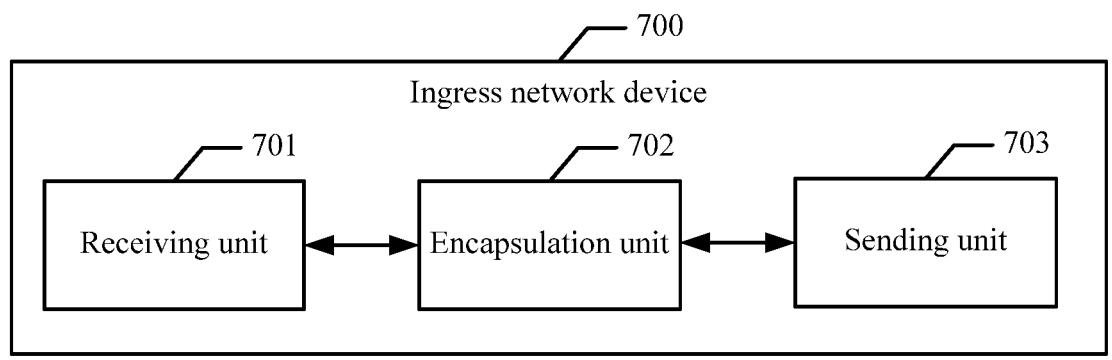
FIG. 7 is a schematic structural diagram of an ingress network device according to an embodiment of the present disclosure.

The following describes an ingress network device configured to implement the data stream processing method shown in FIG. 3. The ingress network device is an ingress network device on an LSP of a data stream. Referring to FIG. 7, the ingress network device 700 in this embodiment includes a receiving unit 701 configured to receive a first BGP update packet sent by a controller, and receive the data stream sent by a CE, where the first BGP update packet includes a stream identifier of the data stream and a source label allocated by the controller to the data stream, an encapsulation unit 702 configured to encapsulate the source label and a forwarding label in the data stream identified by the stream identifier, and a sending unit 703 configured to send the encapsulated data stream to an egress network device on the LSP of the data stream according to the forwarding label such that the egress network device identifies, according to the source label, a source object from which the data stream originates.

Further, the source object of the data stream includes the ingress network device from which the data stream originates, a VPN instance on the ingress network device from which the data stream originates, or the CE of the VPN instance on the ingress network device from which the data stream originates.

Further, the source label is unique in the egress network device.

Further, the first BGP update packet further includes a source label identifier used to indicate that a label type is a source label, and the source label identifier is further encapsulated in the data stream.

It should be noted that for steps not detailed in this embodiment, refer to the descriptions of the method embodiment shown in FIG. 3. Details are not described herein again.

Figure 8:
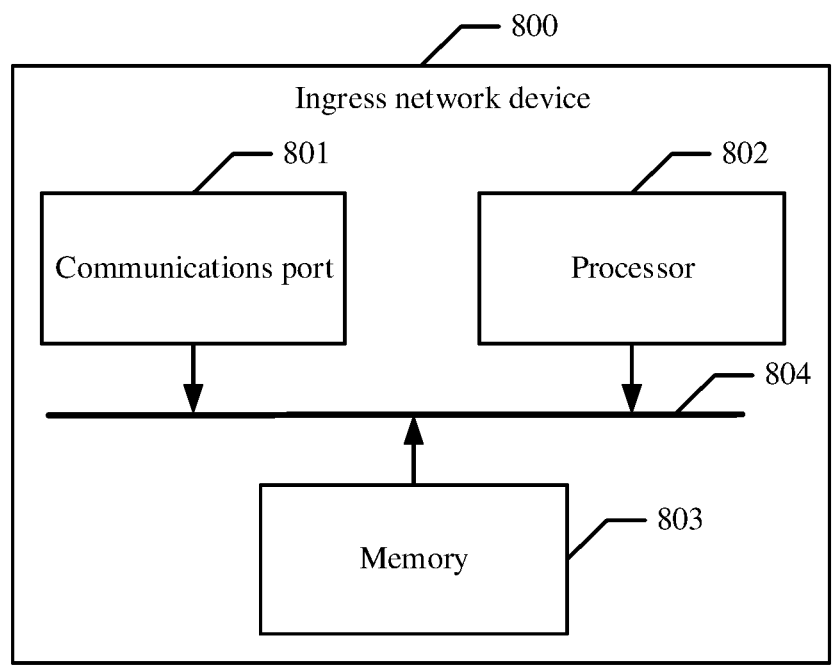
FIG. 8 is another schematic structural diagram of an ingress network device according to an embodiment of the present disclosure.

Corresponding to the method shown in FIG. 3, FIG. 8 is a schematic diagram of another embodiment of an ingress network device 800 according to the present disclosure. The ingress network device 800 in this embodiment includes a communications port 801, a processor 802, a memory 803, and a bus 804. The processor 802, the memory 803, and the communications port 801 are connected and complete communication with each other using the bus 804.

The bus 804 may be an ISA bus, PCI bus, an EISA bus, or the like. The bus 804 may be classified into one or more of an address bus, a data bus, or a control bus. For convenience of representation, only one bold line is used for representation in FIG. 8, but it does not represent that there is only one bus or one type of bus.

The memory 803 is configured to store executable program code. The program code includes a computer operation instruction. When the ingress network device 800 executes the program code, the ingress network device 800 can complete step 301 to step 303 in the embodiment in FIG. 3, and can implement all functions of the ingress network device 700 in the embodiment in FIG. 7. The memory 803 may include a high-speed RAM. Optionally, the memory 803 may further include a non-volatile memory. For example, the memory 803 may include a magnetic disk memory.

The processor 802 may be a CPU or an ASIC, or may be configured into one or more integrated circuits for implementing this embodiment the present disclosure.

Further, in this embodiment, the processor 802 is configured to receive, using the communications port 801, a first BGP update packet sent by a controller, and receive, using the communications port 801, the data stream sent by a CE, where the first BGP update packet includes a stream identifier of the data stream and a source label allocated by the controller to the data stream, encapsulate the source label and a forwarding label in the data stream identified by the stream identifier, and send the encapsulated data stream to an egress network device on the LSP of the data stream according to the forwarding label such that the egress network device identifies, according to the source label, a source object from which the data stream originates.

In addition, the processor 802 is further configured to perform other actions in the method embodiment corresponding to FIG. 3. Details are not described herein again.

Figure 9:
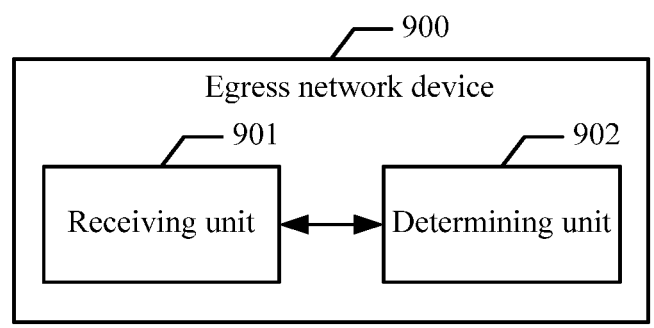
FIG. 9 is a schematic structural diagram of an egress network device according to an embodiment of the present disclosure.

The following describes an egress network device configured to implement the data stream processing method shown in FIG. 4. The egress network device is an egress network device on an LSP of a data stream. Referring to FIG. 9, the egress network device 900 in this embodiment includes a receiving unit 901 configured to receive a second BGP update packet sent by a controller, and receive the data stream sent by an ingress network device on the LSP of the data stream, where a source label allocated by the controller to the data stream is encapsulated in the data stream, and the second BGP update packet includes a mapping relationship between the source label and a source object of the data stream, and a determining unit 902 configured to determine, according to the source label and the mapping relationship between the source label and the source object of the data stream, that the data stream originates from the source object.

Further, the source object of the data stream includes the ingress network device from which the data stream originates, a VPN instance on the ingress network device from which the data stream originates, or the CE of the VPN instance on the ingress network device from which the data stream originates.

Further, the source label is unique in the egress network device 900.

Further, a source label identifier used to indicate that a label type is a source label is further encapsulated in the data stream.

Further, the second BGP update packet carries a source identifier attribute, and the source identifier attribute includes a type field used to indicate that a label type is a source label, and a source label field and a source object identifier field that are used to determine the mapping relationship between the source label and the source object of the data stream.

Further, the second BGP update packet carries the source identifier attribute, and the source identifier attribute includes a NLRI field. The NLRI field includes an NLRI type field, an NLRI length field, the source label field, and the source object identifier field. The NLRI type field is used to indicate that a label type is a source label. The NLRI length field is used to indicate an NLRI length. The source label field is used to carry the source label. The source object identifier field is used to carry an identifier of the source object and an identifier of the egress network device 900.

It should be noted that for steps not detailed in this embodiment, refer to the descriptions of the method embodiment shown in FIG. 4. Details are not described herein again.

Figure 10:
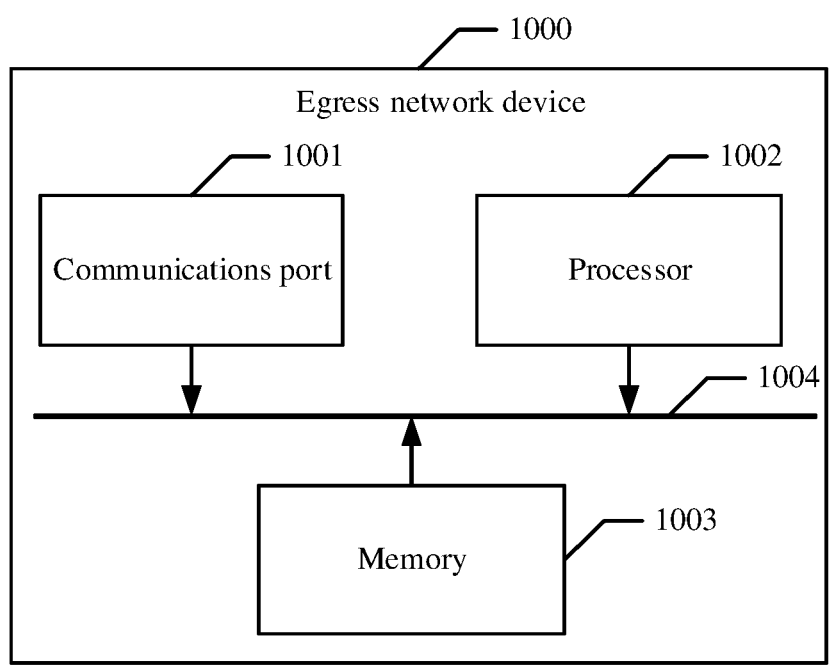
FIG. 10 is another schematic structural diagram of an egress network device according to an embodiment of the present disclosure.

Corresponding to the method shown in FIG. 4, FIG. 10 is a schematic diagram of another embodiment of an egress network device 1000 according to the present disclosure. The egress network device 1000 in this embodiment includes a communications port 1001, a processor 1002, a memory 1003, and a bus 1004. The processor 1002, the memory 1003, and the communications interface 1001 are connected and complete communication with each other using the bus 1004.

The bus 1004 may be an ISA bus, a PCI bus, an EISA bus, or the like. The bus 1004 may be classified into one or more of an address bus, a data bus, or a control bus. For convenience of representation, only one bold line is used for representation in FIG. 10, but it does not represent that there is only one bus or one type of bus.

The memory 1003 is configured to store executable program code. The program code includes a computer operation instruction. When the egress network device 1000 executes the program code, the egress network device 1000 can complete step 401 and step 402 in the embodiment in FIG. 4, and can implement all functions of the egress network device 900 in the embodiment in FIG. 9. The memory 1003 may include a high-speed RAM. Optionally, the memory 1003 may further include a non-volatile memory. For example, the memory 1003 may include a magnetic disk memory.

The processor 1002 may be a CPU or an ASIC, or may be configured into one or more integrated circuits for implementing this embodiment the present disclosure.

Further, in this embodiment, the processor 1002 is configured to receive, using the communications port 1001, a second BGP update packet sent by a controller, and receive, using the communications port 1001, the data stream sent by an ingress network device on the LSP of the data stream, where a source label allocated by the controller to the data stream is encapsulated in the data stream, and the second BGP update packet includes a mapping relationship between the source label and a source object of the data stream, and determine, according to the source label and the mapping relationship between the source label and the source object of the data stream, that the data stream originates from the source object.

In addition, the processor 1002 is further configured to perform other actions in the method embodiment corresponding to FIG. 4. Details are not described herein again.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be implemented as one or more communications buses or signal cables. A person of ordinary skill in the art may understand and implement the embodiments of the present disclosure without creative efforts.

Based on the description of the foregoing implementation manners, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the other approaches may be implemented in a form of a software product. The software product is stored in a readable storage medium, such as a floppy disk, a universal serial bus (USB) flash drive, a removable hard disk, a read-only memory (ROM), a RAM, a magnetic disk, or an optical disc of a computer, and includes several instructions for instructing a computer device (which may be a personal computer, a server, a network device, and the like) to perform the methods described in the embodiments of the present disclosure.

The foregoing describes in detail the label management method, the data stream processing method, and the device that are provided in the embodiments of the present disclosure. A person of ordinary skill in the art may make modifications to the specific implementations and application scopes according to the idea of the embodiments of the present disclosure. In conclusion, the content of this specification should not be construed as a limit to the present disclosure.

What is claimed is:

1. A label management method, comprising:
allocating, by a controller, a source label to a data stream, wherein the source label indicates a source object, wherein the source object is an object from which the data stream originates, and wherein the source object of the data stream comprises an ingress network device from which the data stream originates, a virtual private network (VPN) instance on the ingress network device from which the data stream originates, or a customer edge (CE) of the VPN instance on the ingress network device from which the data stream originates;
sending, by the controller, a first Border Gateway Protocol (BGP) update packet to the ingress network device on a label switching path (LSP) of the data stream; and
sending, by the controller, a second BGP update packet to an egress network device on the LSP of the data stream, wherein the first BGP update packet comprises a stream identifier of the data stream and the source label, and wherein the second BGP update packet comprises a mapping relationship between the source label and the source object of the data stream.

2. The label management method of claim 1, wherein the source label is unique in the egress network device.

3. The label management method of claim 1, wherein the first BGP update packet further comprises a source label identifier indicating that a label type comprises the source label.

4. The label management method of claim 3, wherein the second BGP update packet carries a source identifier attribute, and wherein the source identifier attribute comprises a type field indicating that the label type comprises the source label, and a source label field and a source object identifier field determining the mapping relationship between the source label and the source object of the data stream.

5. The label management method of claim 1, wherein the source label is unique in the egress network device on a label switching path of the data stream.

6. The label management method of claim 1, wherein the ingress network device comprises a communications port, a memory, and a processor.

7. The label management method of claim 1, wherein the stream identifier comprises a name.

8. The label management method of claim 1, wherein the stream identifier comprises routing information.

9. The label management method of claim 1, wherein the source label comprises a network layer reachability information (NLRI) field.

10. The label management method of claim 9, wherein the NLRI field comprises an NLRI type field and an NLRI length field.

11. The label management method of claim 10, wherein the NLRI type field indicates that a label type is the source label, and wherein the NLRI length field indicates an NLRI length.

12. A data stream processing method, applied to an ingress network device on a label switching path (LSP) of a data stream, comprising:
receiving, by the ingress network device, a first Border Gateway Protocol (BGP) update packet from a controller;
receiving, by the ingress network device, the data stream from a customer edge (CE), wherein the first BGP update packet comprises a stream identifier of the data stream and a source label allocated by the controller to the data stream, wherein the source label indicates a source object, wherein the source object is an object from which the data stream originates, and wherein the source object of the data stream comprises the ingress network device from which the data stream originates, a virtual private network (VPN) instance on the ingress network device from which the data stream originates, or the CE of the VPN instance on the ingress network device from which the data stream originates;
encapsulating, by the ingress network device, the source label and a forwarding label in the data stream identified by the stream identifier; and
sending, by the ingress network device, the data stream to an egress network device on the LSP of the data stream according to the forwarding label to enable the egress network device to identify, according to the source label, the source object from which the data stream originates.

13. The data stream processing method of claim 12, wherein the source label is unique in the egress network device.

14. The data stream processing method of claim 12, wherein the first BGP update packet further comprises a source label identifier indicating that a label type comprises the source label, and wherein the source label identifier is encapsulated in the data stream.

15. A data stream processing method, applied to an egress network device on a label switching path (LSP) of a data stream, comprising:
receiving, by the egress network device, a Border Gateway Protocol (BGP) update packet from a controller;
receiving, by the egress network device, the data stream from an ingress network device, wherein a source label allocated by the controller to the data stream is encapsulated in the data stream, wherein the BGP update packet comprises a mapping relationship between the source label and a source object of the data stream, wherein the source label indicates the source object, wherein the source object is an object from which the data stream originates, and wherein the source object of the data stream comprises the ingress network device from which the data stream originates, a virtual private network (VPN) instance on the ingress network device from which the data stream originates, or a customer edge (CE) of the VPN instance on the ingress network device from which the data stream originates; and
identifying, by the egress network device according to the source label and the mapping relationship between the source label and the source object of the data stream, that the data stream originates from the source object.

16. The data stream processing method of claim 15, wherein the source label is unique in the egress network device.

17. The data stream processing method of claim 15, wherein a source label identifier indicates that a label type comprises the source label encapsulated in the data stream.

18. The data stream processing method of claim 17, wherein the BGP update packet carries a source identifier attribute, and wherein the source identifier attribute comprises a type field indicating that the label type comprises the source label, and a source label field and a source object identifier field determining the mapping relationship between the source label and the source object of the data stream.

* * * * *